US007887972B2

(12) United States Patent
Alexandrovichserov et al.

(10) Patent No.: US 7,887,972 B2
(45) Date of Patent: Feb. 15, 2011

(54) CATHODE CATALYST FOR FUEL CELL, METHOD OF PREPARING SAME, AND MEMBRANE-ELECTRODE ASSEMBLY AND FUEL CELL COMPRISING SAME

(75) Inventors: Alexey Alexandrovichserov, Yongin-si (KR); Chan Kwak, Yongin-si (KR); Ho-Jin Kweon, Yongin-si (KR); Si-Hyun Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1091 days.

(21) Appl. No.: 11/595,949

(22) Filed: Nov. 13, 2006

(65) Prior Publication Data

US 2007/0122683 A1 May 31, 2007

(30) Foreign Application Priority Data

Nov. 11, 2005 (KR) .................... 10-2005-0107972

(51) Int. Cl.
*H01M 4/92* (2006.01)
*H01M 8/10* (2006.01)
*H01M 4/38* (2006.01)
*B01J 21/18* (2006.01)
*B01J 27/20* (2006.01)

(52) U.S. Cl. .................... 429/487; 429/492; 429/485; 502/174; 502/177

(58) Field of Classification Search .................... 429/30, 429/40, 42–44, 484, 487, 492; 502/100–101, 502/215, 326, 117; 427/115
See application file for complete search history.

(56) References Cited

U.S. PATENT DOCUMENTS

2002/0015878 A1 2/2002 Tsumura et al.

(Continued)

FOREIGN PATENT DOCUMENTS

CN 1521877 8/2004

(Continued)

OTHER PUBLICATIONS

Shukla et al. ("Methanol-Resistant Oxygen-Reduction Catalysts for Direct Methanol Fuel Cells," Annu. Rev. Mater. Res., 2003, 33, 155-168).*

(Continued)

*Primary Examiner*—Dah-Wei D Yuan
*Assistant Examiner*—Claire L Rademaker
(74) *Attorney, Agent, or Firm*—Christie, Parker & Hale, LLP (57) ABSTRACT

A cathode catalyst for a fuel cell includes an Ru—Se alloy having an average particle size of less than or equal to 6 nm. The Ru—Se alloy is amorphous catalyst. A membrane electrode assembly and a fuel cell system include the cathode catalyst. A catalyst for a fuel cell is prepared by drying a ruthenium solution including a water-soluble ruthenium precursor to obtain a first dried product; subjecting the first dried product to a first heat-treatment to obtain a heat-treated product; adding an Se solution including a water-soluble Se precursor to the heat-treated product to obtain a mixture; drying the mixture to obtain a second dried product including ruthenium and Se; and subjecting the second dried product to second heat-treatment.

16 Claims, 10 Drawing Sheets

U.S. PATENT DOCUMENTS

2003/0157396 A1* 8/2003 Beckmann et al. ............ 429/44
2004/0096728 A1   5/2004 Campbell

FOREIGN PATENT DOCUMENTS

| DE | 19644628   | 10/1996 |
|----|------------|---------|
| JP | 2001-502467 | 2/2001  |
| JP | 2005-129369 | 5/2005  |

OTHER PUBLICATIONS

Alonson-Vante N et al., "The structure analysis of the active centers of Ru-containing electrocatalysts for the oxygen reduction. An in situ EXAFS study", Electrochimica Acta, Elsevier Science Publishers, vol. 47, No. 22-23, pp. 3807-3814, Aug. 30, 2002.

Office Action issued in corresponding European Patent Application No. 06023487.9 dated Jan. 5, 2009.

Patent Abstracts of Japan and English machine translation of Japanese Publication 2005-129369 listed above.

SIPO Patent Gazette dated Sep. 22, 2010, for corresponding Chinese Patent application 200610063967.X, noting listed reference in this IDS, as well as U.S. and Chinese references previously filed in an IDS dated Mar. 6, 2009.

* cited by examiner

CATHODE CATALYST FOR FUEL CELL, METHOD OF PREPARING SAME, AND MEMBRANE-ELECTRODE ASSEMBLY AND FUEL CELL COMPRISING SAME

CROSS-REFERENCE TO RELATED APPLICATIONS

This application claims the benefit of Korean Application No. 2005-107972, filed on Nov. 11, 2005, in the Korean Intellectual Property Office, the disclosure of which is incorporated herein by reference.

BACKGROUND OF THE INVENTION

1. Field of the Invention

Aspects of the present invention relate to a cathode catalyst for a fuel cell, a membrane-electrode assembly for a fuel cell, and a fuel cell system including the same. More particularly, aspects of the present invention relate to a cathode catalyst having a high catalytic activity, and a membrane-electrode assembly and a fuel cell system including the same.

2. Description of the Related Art

A fuel cell is a power generation system for producing electrical energy through an electrochemical redox reaction of an oxidant and hydrogen, particularly hydrogen contained in a hydrocarbon-based material such as methanol, ethanol, or natural gas.

Such a fuel cell is a clean energy system that can replace energy systems that use fossil fuels. A typical fuel cell includes a stack composed of unit cells and produces various ranges of power output. Since a fuel cell has an energy density that is four to ten times higher than that of a small lithium battery, fuel cells have been promoted as small portable power sources.

Representative exemplary fuel cells include a polymer electrolyte membrane fuel cell (PEMFC) and a direct oxidation fuel cell (DOFC). The direct oxidation fuel cell includes a direct methanol fuel cell that uses methanol as a fuel.

The polymer electrolyte fuel cell has advantages of high energy density and high power, but also has problems such as the need to handle hydrogen gas carefully and the requirement for accessory facilities such as a fuel reforming processor for reforming methane or methanol, natural gas, and the like in order to produce the hydrogen that is used as the fuel gas.

On the other hand, a direct oxidation fuel cell has a lower energy density than a polymer electrolyte fuel cell has, but has the advantages of easy handling, a low operation temperature, and no requirement of additional fuel reforming processors.

In the above-mentioned fuel cell systems, a stack that generates electricity typically includes several to scores of unit cells stacked adjacent to one another, and each unit cell is formed of a membrane-electrode assembly (MEA) and a separator (also referred to as a bipolar plate). The membrane-electrode assembly is composed of an anode (also referred to as a "fuel electrode" or an "oxidation electrode") and a cathode (also referred to as an "air electrode" or a "reduction electrode") that are separated by a polymer electrolyte membrane.

In a typical fuel cell system, fuel is supplied to an anode and is adsorbed onto catalysts of the anode, where the fuel is oxidized to produce protons and electrons. The electrons are transferred to a cathode via an external circuit, thereby producing usable electricity, and the protons are transferred into the cathode through the polymer electrolyte membrane. In addition, an oxidant is supplied to the cathode. The oxidant, protons, and electrons react in the presence of catalysts of the cathode to produce water.

SUMMARY OF THE INVENTION

One embodiment of the present invention provides a cathode catalyst for a fuel cell that has excellent activity.

Another embodiment of the present invention provides a method for preparing a catalyst.

Yet another embodiment of the present invention provides a membrane-electrode assembly for a fuel cell including the cathode catalyst.

Still another embodiment of the present invention provides a fuel cell system including the membrane-electrode assembly.

According to one embodiment of the present invention, a cathode catalyst for a fuel cell that includes an Ru—Se alloy having an average particle size of less than or equal to 6 nm, is provided.

According to an aspect of the present invention, the Ru—Se alloy is an amorphous catalyst.

According to an aspect of the present invention, the cathode catalyst has a peak intensity ratio of carbon peak intensity with respect to ruthenium peak intensity ($I_{carbon\ peak}/I_{ruthenium\ peak}$) ranging from 0.4 to 1.5 in an X-ray diffraction pattern measured using a CuKα ray.

According to an aspect of the present invention, the cathode catalyst has an average particle size ranging from 3 to 5 nm.

According to an aspect of the present invention, the cathode catalyst includes 3 to 20 parts by weight of Se based on 100 parts by weight of Ru.

According to an aspect of the present invention, the cathode catalyst further includes a carrier, and includes 10 to 90 wt % of Ru based on the total weight of the catalyst.

According to another embodiment of the present invention, a method of preparing a catalyst is provided. The method includes drying a ruthenium solution including a water-soluble ruthenium precursor to obtain a dried product; subjecting the dried product to first heat-treatment; adding an Se solution including a water-soluble Se precursor to the heat-treated product to obtain a mixture; drying the mixture to obtain a dried product including ruthenium and Se; and subjecting the dried product to second heat-treatment.

According to an aspect of the present invention, the drying of the ruthenium solution is performed by a process including first drying of the ruthenium solution, and second drying of the first-dried product under vacuum. The drying of the mixture is performed by a process including third drying of the mixture, and fourth drying of the third-dried product under vacuum.

According to an aspect of the present invention, the first and second heat treatments are performed at a temperature of 100 to 450° C. The first and third drying processes are performed at a temperature of 70 to 90° C. for 2 to 30 hours. The second and fourth drying processes are performed for 4 to 9 hours.

The heat treatment is performed under a reducing gas atmosphere selected from the group consisting of a $H_2$ gas atmosphere, and a mixed gas atmosphere of $H_2$ and $N_2$.

According to yet another embodiment of the present invention, a membrane-electrode assembly for a fuel cell including an anode and a cathode facing each other and a polymer electrolyte membrane interposed therebetween is provided. The cathode includes the cathode catalyst according to an aspect of the present invention or a cathode prepared by a method according to an aspect of the present invention.

According to still another embodiment of the present invention, a fuel cell system including an electricity generating element, which includes a membrane-electrode assembly and a separator positioned at each side of the membrane-electrode assembly, a fuel supplier that supplies the electricity generating element with a fuel, and an oxidant supplier that supplies the electricity generating element with an oxidant, is provided. The membrane-electrode assembly includes a cathode catalyst according to an aspect of the present invention or a cathode prepared by a method according to an aspect of the present invention.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

An exemplary embodiment of the present invention will hereinafter be described in detail with reference to the accompanying drawings.

According to the one embodiment of the present invention, an Ru-containing cathode catalyst is provided instead of a platinum-based catalyst such as is generally used in a cathode. The Ru-containing catalyst has excellent activity and stability for an oxygen reduction reaction.

According to one embodiment of the present invention, the cathode catalyst is an amorphous Ru—Se catalyst that includes Ru and Se. Particularly, the Ru—Se catalyst has improved catalytic activity in comparison to a platinum-based catalyst since the Ru—Se catalyst has no reactivity for an oxidation reaction of a fuel, particularly a hydrocarbon fuel. An amorphous catalyst provides more defect sites, which act as a catalyst active site, than a crystalline catalyst. Therefore, the amorphous Ru—Se catalyst has a more improved catalytic activity than a crystalline Ru—Se catalyst.

The cathode catalyst may have an average particle diameter of less than or equal to 6 nm, which is significantly smaller than a conventional platinum-based catalyst or a crystalline Ru—Se catalyst. As a specific, non-limiting example, the cathode catalyst may have an average particle diameter ranging from 3 to 5 nm. A smaller particle diameter provides an increase in the catalyst active surface area, and thereby improves catalyst activity.

The cathode catalyst may have a peak intensity ratio of the carbon peak intensity with respect to the ruthenium peak intensity ($I_{carbon\ peak}/I_{ruthenium\ peak}$) ranging from 0.4 to 1.5 in an X-ray diffraction pattern measured using a CuKα ray. Herein, the carbon is carbon black. When the peak intensity ratio is less than 0.4, the amorphous properties may be too large to obtain stability, whereas when it is more than 1.5, the crystallinity may be too high to increase catalyst activity.

The cathode catalyst may include 3 to 20 parts by weight of Se based on 100 parts by weight of Ru. When the Se content is less than 3 parts by weight, the catalyst activity may decrease, and the resistance to reactivity with a fuel, particularly a hydrocarbon fuel such as methanol, may decrease. When the Se content is more than 20 parts by weight, the active sites of Ru may decrease.

The cathode catalyst may be used in the form of a catalytic metal by itself (that is, a black catalyst), or can be used while being supported on a carrier. The carrier may include carbon such as activated carbon, denka black, ketjen black, acetylene black, or graphite, as non-limiting examples. When the cathode catalyst is supported on a carrier, Ru is included in an amount of 10 to 90 wt % based on the total weight of the catalyst. When Ru is included in an amount less than 10 wt %, catalytic active components may not be sufficiently provided, whereas when the amount of Ru is more than 90 wt %, electrical conductivity of the catalyst may not be sufficient. When the cathode catalyst is supported on a carrier, the Se content may be 3 to 20 parts by weight based on 100 parts by weight of Ru.

The cathode catalyst for a fuel cell according to one embodiment may be prepared as follows.

First, a water-soluble ruthenium precursor is added to a solvent. As non-limiting examples, the water-soluble ruthenium precursor may be $RuCl_3$ hydrate, ruthenium acetyl acetonate ($Ru(C_5H_7O_2)_3$) ruthenium carbonyl ($Ru_3(CO)_{12}$), or combinations thereof. As non-limiting examples, the solvent may be water, acetone, or an alcohol such as methanol or ethanol, or combinations thereof.

During the above process, a carrier may be further added so that a carrier-supported catalyst can be prepared. The carrier may include a carrier described above.

The mixture of the water-soluble ruthenium precursor, solvent and carrier is dried. The drying process may be performed by a process including subjecting the mixture to first drying, and then subjecting the first-dried product to second drying under vacuum.

The first drying process may be performed at a temperature of 70 to 90° C. for 2 to 30 hours. The second drying process may be performed by placing the first-dried product under vacuum for 4 to 9 hours and may be performed at a temperature appropriate for decomposing the water-soluble ruthenium precursor. For example, when the water-soluble ruthenium precursor is $RuCl_3$ hydrate, the drying temperature may be more than or equal to 140° C., and, as a specific, non-limiting example, may be about 200° C.

The dried mixture may be subjected to a first heat treatment. The first heat treatment may be performed at a temperature of 100 to 450° C. The heat treatment may be performed under a reducing gas atmosphere selected from the group consisting of an $H_2$ gas atmosphere, and a mixed gas atmosphere of $H_2$ and $N_2$. In the mixed $H_2$ and $N_2$ gas, $H_2$ and $N_2$ may be included in any suitable volume ratio. For example, there need be no upper limit in the volume ratio of $H_2$ to $N_2$, since the gas atmosphere can be entirely hydrogen. On the other hand, the volume ratio of $H_2$ to $N_2$ is typically not less than 1:0.01 to 3. The volume ratio of $H_2$ to $N_2$ may be 1:0.75 to 3.

An Se solution including a water-soluble Se precursor is added to the heat-treated product. The Se solution may be prepared by mixing a water-soluble Se precursor such as selenous acid ($H_2SeO_3$) to a solvent such as acetone, an alcohol including methanol or ethanol, or water.

The mixture is dried again. The drying of the mixture may be performed by a process including subjecting the mixture to third drying, and subjecting the third-dried product to fourth drying under vacuum. The third drying process may be performed at a temperature of 70 to 90° C. for 2 to 30 hours. The fourth drying process may be performed by placing the third-dried product under vacuum for 4 to 9 hours. The fourth drying process is performed at a temperature appropriate for decomposing the water-soluble selenium precursor. For example, when the water-soluble selenium precursor is selenous acid ($H_2SeO_3$), the drying temperature may be more than or equal to 140° C., and as a specific, non-limiting example, may be about 200° C.

The mixture is subjected to second heat treatment to prepare the catalyst. The second heat treatment may be performed at a temperature of 100 to 450° C. The heat treatment may be performed under a reducing gas atmosphere selected from the group consisting of an $H_2$ gas atmosphere, and a mixed gas atmosphere of $H_2$ and $N_2$. In the mixed $H_2$ and $N_2$ gas, $H_2$ and $N_2$ may be included in any suitable volume ratio. For example, there is no upper limit in the volume ratio of $H_2$ to $N_2$, since the gas atmosphere can be entirely hydrogen. On the other hand, the volume ratio of $H_2$ to $N_2$ is typically 1:0.01 to 3. The volume ratio of $H_2$ to $N_2$ may be 1:0.75 to 3.

The above catalyst is used for a cathode, and a conventional platinum-based catalyst may be used for an anode. The platinum-based catalyst may include at least one selected from the group consisting of platinum, ruthenium, osmium, platinum-ruthenium alloys, platinum-osmium alloys, platinum-palladium alloys, platinum-M alloys (where M is a transition element selected from the group consisting of Ga, Ti, V, Cr, Mn, Fe, Co, Ni, Cu, Zn, Sn, Mo, W, Rh, and combinations thereof, and combinations thereof. More specifically, non-limiting examples of the platinum-based catalyst are selected from the group consisting of Pt, Pt/Ru, Pt/W, Pt/Ni, Pt/Sn, Pt/Mo, Pt/Pd, Pt/Fe, Pt/Cr, Pt/Co, Pt/Ru/W, Pt/Ru/Mo, Pt/Ru/V, Pt/Fe/Co, Pt/Ru/Rh/Ni, Pt/Ru/Sn/W, and combinations thereof.

Such a metal catalyst may be used in a form of a metal by itself (a black catalyst), or a metal supported in a carrier. The carrier may include carbon such as graphite, denka black, ketjen black, acetylene black, carbon nanotubes, carbon nanofiber, carbon nanowire, carbon nanoballs, or activated carbon, or an inorganic particulate such as alumina, silica, zirconia, or titania, as non-limiting examples. Typically, carbon can be used.

The cathode and anode catalysts are disposed on electrode substrates. The electrode substrates support the anode and cathode, respectively, and provide a path for transferring fuel and oxidant to the catalyst layer. For the electrode substrates, a conductive substrate is used, which can be, for example, a carbon paper, a carbon cloth, a carbon felt, or a metal cloth (a porous film including a metal cloth fiber or a metalized polymer fiber), but is not limited thereto.

The electrode substrates may be treated with a fluorine-based resin to be water-repellent to prevent the deterioration of diffusion efficiency due to water generated during the operation of a fuel cell. The fluorine-based resin may include polyvinylidene fluoride, polytetrafluoroethylene, fluorinated ethylene propylene, polychlorotrifluoro ethylene, a fluoroethylene polymer, or copolymers thereof, but is not limited thereto.

A microporous layer (MPL) can be added between the aforementioned electrode substrates and catalyst layer to increase reactant diffusion effects. The microporous layer generally includes conductive powders with a particular particle diameter. The conductive material may include, but is not limited to, carbon powder, carbon black, acetylene black, activated carbon, carbon fiber, fullerene, nanocarbon, or combinations thereof. The nanocarbon may include a material such as carbon nanotubes, carbon nanofiber, carbon nanowire, carbon nanohorns, carbon nanorings, or combinations thereof.

The microporous layer is formed by coating a composition comprising a conductive powder, a binder resin, and a solvent on the conductive substrate. The binder resin may include, but is not limited to, polytetrafluoro ethylene, polyvinylidene fluoride, polyhexafluoro propylene, polyperfluoroalkylvinyl ether, polyperfluoro sulfonylfluoride alkoxy vinyl ether, polyvinyl alcohol, cellulose acetate, or copolymers thereof. The solvent may include, but is not limited to, an alcohol such as ethanol, isopropyl alcohol, n-propyl alcohol, butanol and so on, water, dimethyl acetamide, dimethyl sulfoxide, N-methylpyrrolidone, and tetrahydrofuran.

The coating method may include, but is not limited to, screen printing, spray coating, doctor blade methods, gravure coating, dip coating, silk screening, painting, and so on, depending on the viscosity of the composition.

Figure 1:
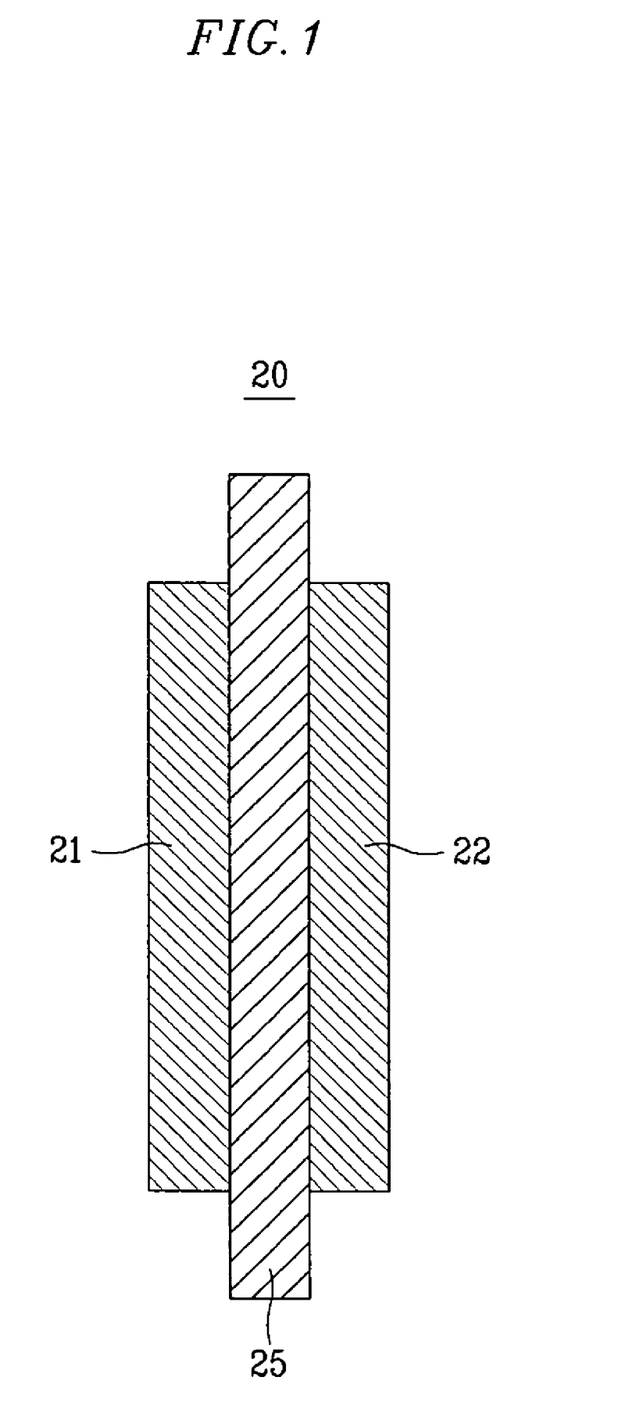
FIG. 1 is a schematic cross-sectional view showing a membrane-electrode assembly according to an embodiment of the present invention.

According to another embodiment, a membrane-electrode assembly includes a cathode and an anode, and a polymer electrolyte membrane between the cathode and anode. FIG. 1 is a schematic cross-sectional view showing a membrane-electrode assembly 20 according to an embodiment of the present invention. Referring to FIG. 1, reference numeral 21 denotes a cathode, reference numeral 22 denotes an anode, and reference numeral 25 denotes a polymer electrolyte membrane.

The polymer electrolyte membrane 25 plays a role of exchanging ions by transferring protons produced at an anode catalyst layer to a cathode catalyst layer. The proton conductive polymer for the polymer electrolyte membrane of the present invention may be any polymer resin having a cation exchange group selected from the group consisting of a sulfonic acid group, a carboxylic acid group, a phosphoric acid group, a phosphonic acid group, and derivatives thereof, at its side chain.

Non-limiting examples of the polymer resin include at least one proton conductive polymer selected from the group consisting of fluoro-based polymers, benzimidazole-based polymers, polyimide-based polymers, polyetherimide-based polymers, polyphenylenesulfide-based polymers polysulfone-based polymers, polyethersulfone-based polymers, polyetherketone-based polymers, polyether-etherketone-based polymers, and polyphenylquinoxaline-based polymers. In one embodiment, the proton conductive polymer is at least one selected from the group consisting of poly(perfluorosulfonic acid), poly(perfluorocarboxylic acid), a copolymer of tetrafluoroethylene and fluorovinylether having a sulfonic acid group, defluorinated polyetherketone sulfide, aryl ketone, poly(2,2'-(m-phenylene)-5,5'-bibenzimidazole), and poly (2,5-benzimidazole). The polymer electrolyte membrane generally has a thickness ranging from 10 to 200 µm.

According to another embodiment of the present invention, a fuel cell system including the above membrane-electrode assembly is provided. The fuel cell system includes at least one of an electricity generating element, a fuel supplier, and an oxidant supplier.

As non-limiting examples, the fuel cell system may be a polymer electrolyte membrane fuel cell (PEMFC), a direct oxidation fuel cell (DOFC), or a mixed reactant fuel cell. A mixed reactant fuel cell includes a catalyst at an anode catalyst layer, which optionally acts only for oxidation of a fuel, and another catalyst at a cathode catalyst layer, which optionally acts only for reduction of an oxidant. Therefore, even if the fuel and oxidant mixture is provided to the anode and cathode catalyst layers, only oxidation of the fuel occurs at the anode catalyst layer, while only reduction of the oxidant occurs at a cathode catalyst layer.

The electricity generating element includes a membrane-electrode assembly and separators disposed at each side of the membrane-electrode assembly. The electricity generating element generates electricity through oxidation of a fuel and reduction of an oxidant.

The fuel supplier supplies the electricity generating element with a fuel that includes hydrogen, and the oxidant supplier supplies the electricity generating element with an oxidant such as oxygen or air. As non-limiting examples, the fuel may be liquid or gaseous hydrogen, or a hydrocarbon-based fuel such as methanol, ethanol, propanol, butanol, or natural gas.

Figure 2:
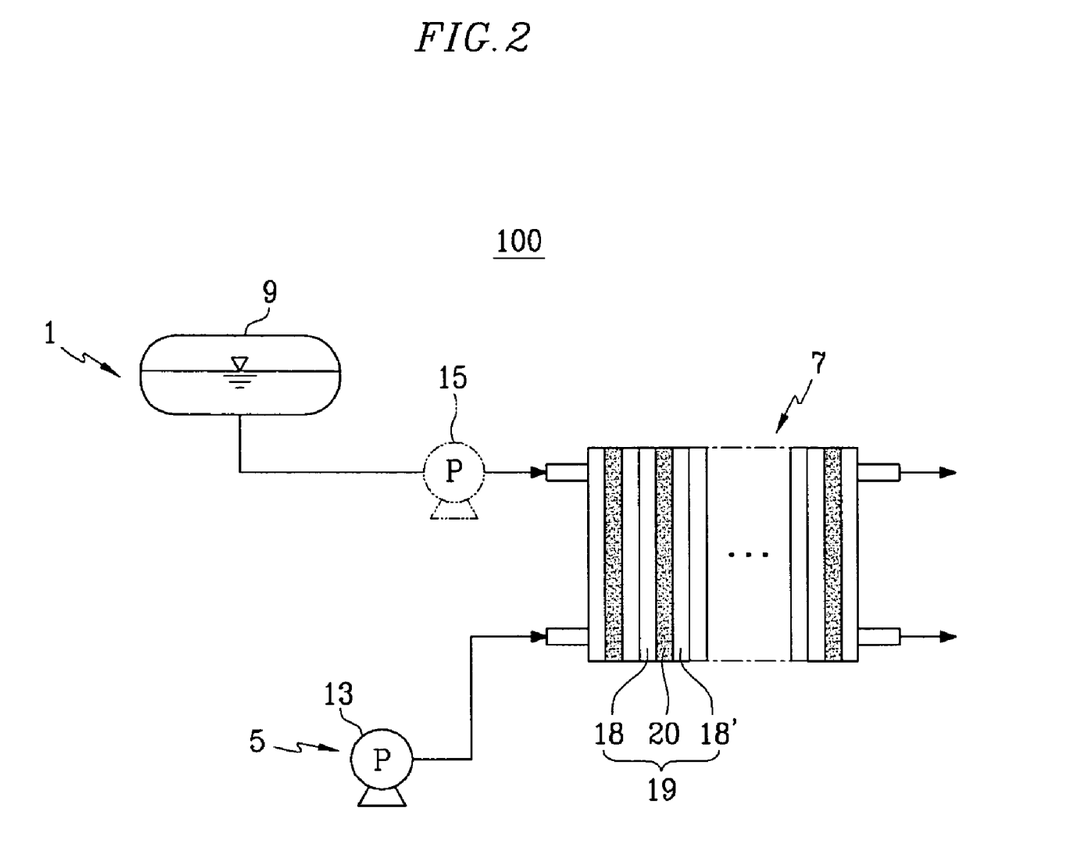
FIG. 2 is a schematic diagram showing the structure of a fuel cell system according to another embodiment of the present invention.

FIG. 2 schematically illustrates a fuel cell system 100 wherein a fuel and an oxidant are provided to an electricity generating element 19 through pumps 13 and 15, but the present invention is not limited to such a structure. Alternatively, the fuel cell system according to aspects of the present invention may include a structure wherein a fuel and an oxidant are provided by diffusion.

The fuel cell system 100 includes at least one electricity generating element 19 that generates electrical energy through an electrochemical reaction of a fuel and an oxidant, a fuel supplier 1 that supplies a fuel to the electricity generating element 19, and an oxidant supplier 5 that supplies the oxidant to the electricity generating element 19.

In addition, the fuel supplier 1 is equipped with a tank 9, which stores fuel, and a fuel pump 15, which is connected therewith. The fuel pump 15 supplies the fuel stored in the tank 9 with a predetermined pumping power.

The oxidant supplier 5, which supplies the electricity generating element 19 with the oxidant, is equipped with at least one pump 13 that supplies the oxidant with a predetermined pumping power.

The electricity generating element 19 includes a membrane-electrode assembly 20 that oxidizes hydrogen or a fuel and reduces an oxidant, separators 18 and 18' that are respectively positioned at opposite sides of the membrane-electrode assembly 20 and supply hydrogen or a fuel, and an oxidant. At least one electricity generating element 19 is stacked to form a stack 7.

The following examples illustrate the present invention in more detail. However, it is understood that the present invention is not limited by these examples.

Example 1

1 g of $RuCl_3$ hydrate was dissolved in 2 ml of acetone to prepare a solution. 1 g of a carbon carrier was added to the solution, and then the mixture was dried at 70° C., under a normal atmosphere for 24 hours. Then, drying under vacuum at 140° C. was performed for 4 hours. The dried sample was heat-treated under a mixed $H_2$ and $N_2$ gas atmosphere (1:1 volume ratio) at 300° C. for 4 hours to prepare Ru/C (Ru supported on a carbon carrier).

Subsequently, 0.075 g of $H_2SeO_3$ was dissolved in 3 ml of acetone to prepare a solution. The solution was added to the Ru/C. The resulting product was dried at 70° C., under a normal atmosphere for 24 hours and then at 140° C., under vacuum, for 4 hours. The dried sample was heat-treated under a mixed $H_2$ and $N_2$ gas atmosphere (1:1 volume ratio) at 300° C. for 4 hours to prepare a cathode catalyst for a fuel cell.

Example 2

A cathode catalyst was prepared according to the same method as in Example 1, except that 0.03 g of $H_2SeO_3$ was used instead of 0.075 g of $H_2SeO_3$.

Example 3

A cathode catalyst was prepared according to the same method as in Example 1, except that 5.4 g of $RuCl_3$ hydrate was used instead of 1 g of $RuCl_3$ hydrate and 0.375 g of $H_2SeO_3$ was used instead of 0.075 g of $H_2SeO_3$.

Example 4

A cathode catalyst was prepared according to the same method as in Example 1, except that 0.74 g of $RuCl_3$ hydrate was used instead of 1 g of $RuCl_3$ hydrate and 0.06 g of $H_2SeO_3$ was used instead of 0.075 g of $H_2SeO_3$.

Example 5

0.6 g of ruthenium carbonyl was dissolved in 150 ml of benzene. 1 g of a carbon carrier was added to the solution, and then the mixture was agitated at 120° C. while refluxing, followed by filtration. The filtered product was washed with distilled water and then dried at 80° C. for 12 hours. The dried sample was heat-treated under a $H_2$ gas atmosphere at 250° C. for 3 hours to prepare Ru/C (Ru supported on a carbon carrier).

Subsequently, 0.075 g of $H_2SeO_3$ was dissolved in 3 ml of acetone to prepare a solution. The solution was added to the Ru/C. The resulting product was dried at 70° C., under a normal atmosphere for 24 hours and then at 140° C., under vacuum, for 4 hours. The dried sample was heat-treated under a mixed $H_2$ and $N_2$ gas atmosphere (1:1 volume ratio) at 300° C. for 4 hours to prepare a cathode catalyst for a fuel cell.

Example 6

A cathode catalyst was prepared according to the same method as in Example 1, except that 1.0 g of ruthenium acetyl acetonate was used instead of 0.6 g of ruthenium carbonyl.

Example 7

A cathode catalyst was prepared according to the same method as in Example 1, except that 0.06 g of Se was used instead of 0.075 g of $H_2SeO_3$.

Example 8

A cathode catalyst was prepared according to the same method as in Example 1, except that 1.0 g of $H_2SeO_3$ was used instead of 0.075 g of $H_2SeO_3$.

Example 9

A cathode catalyst was prepared according to the same method as in Example 1, except that 0.074 g of $RuCl_3$ hydrate was used instead of 1 g of $RuCl_3$ hydrate and 0.0075 g of $H_2SeO_3$ was used instead of 0.075 g of $H_2SeO_3$.

Example 10

A cathode catalyst was prepared according to the same method as in Example 1, except that 97 g of $RuCl_3$ hydrate was used instead of 1 g of $RuCl_3$ hydrate and 7.2 g of $H_2SeO_3$ was used instead of 0.075 g of $H_2SeO_3$.

Comparative Example 1

0.06 g of selenium powder was dissolved in 200 ml of xylene at 140° C. After cooling the solution to room temperature, 2.11 g of $Ru_3(CO)_{12}$ and 1 g of Ketjen black were added successively to the solution being stirred and bubbled with nitrogen. After refluxing it at 135° C. for 24 hours, the solution was filtered and the obtained black powder was dried in an oven at 80° C. overnight. Heat treatment was performed in a flow of hydrogen at 300° C.

Figure 3:
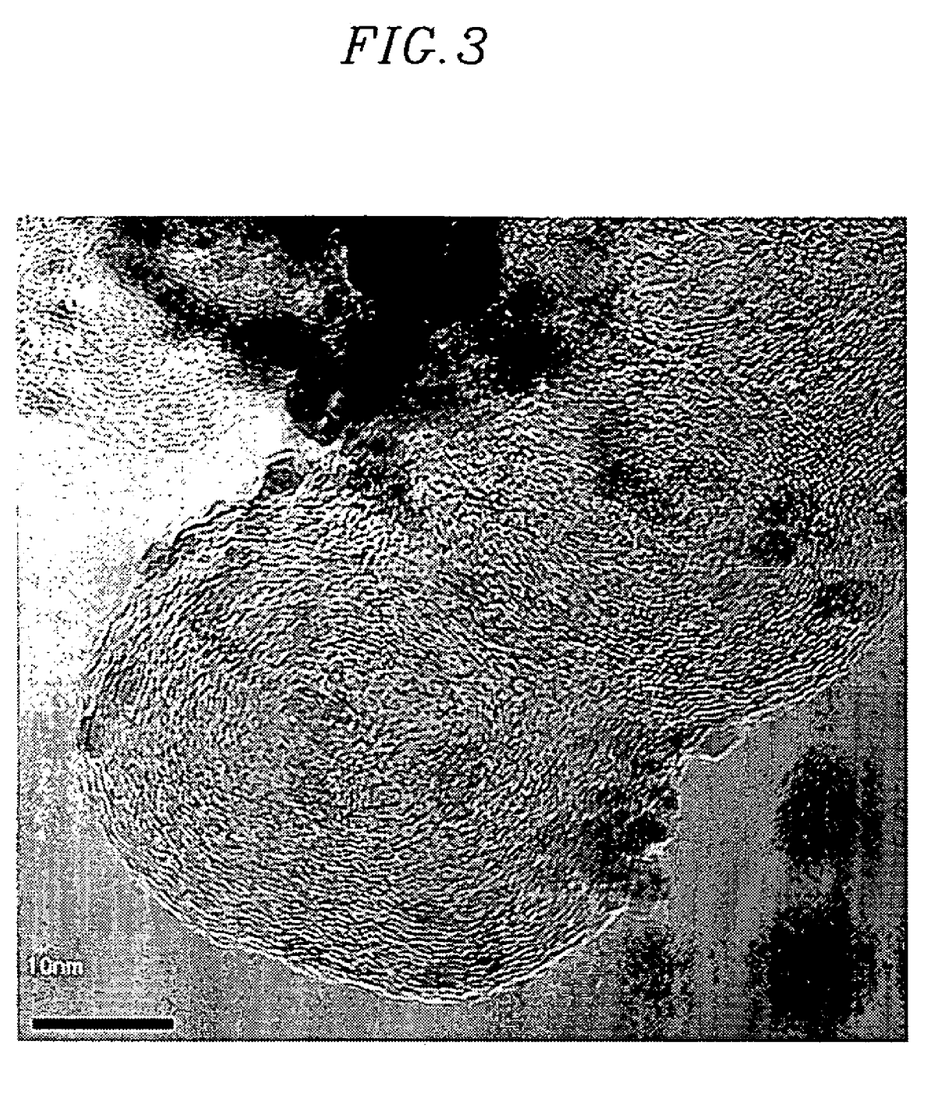
FIG. 3 is a transmission electron microscope (TEM) photograph of a cathode catalyst according to Example 1.
Figure 4:
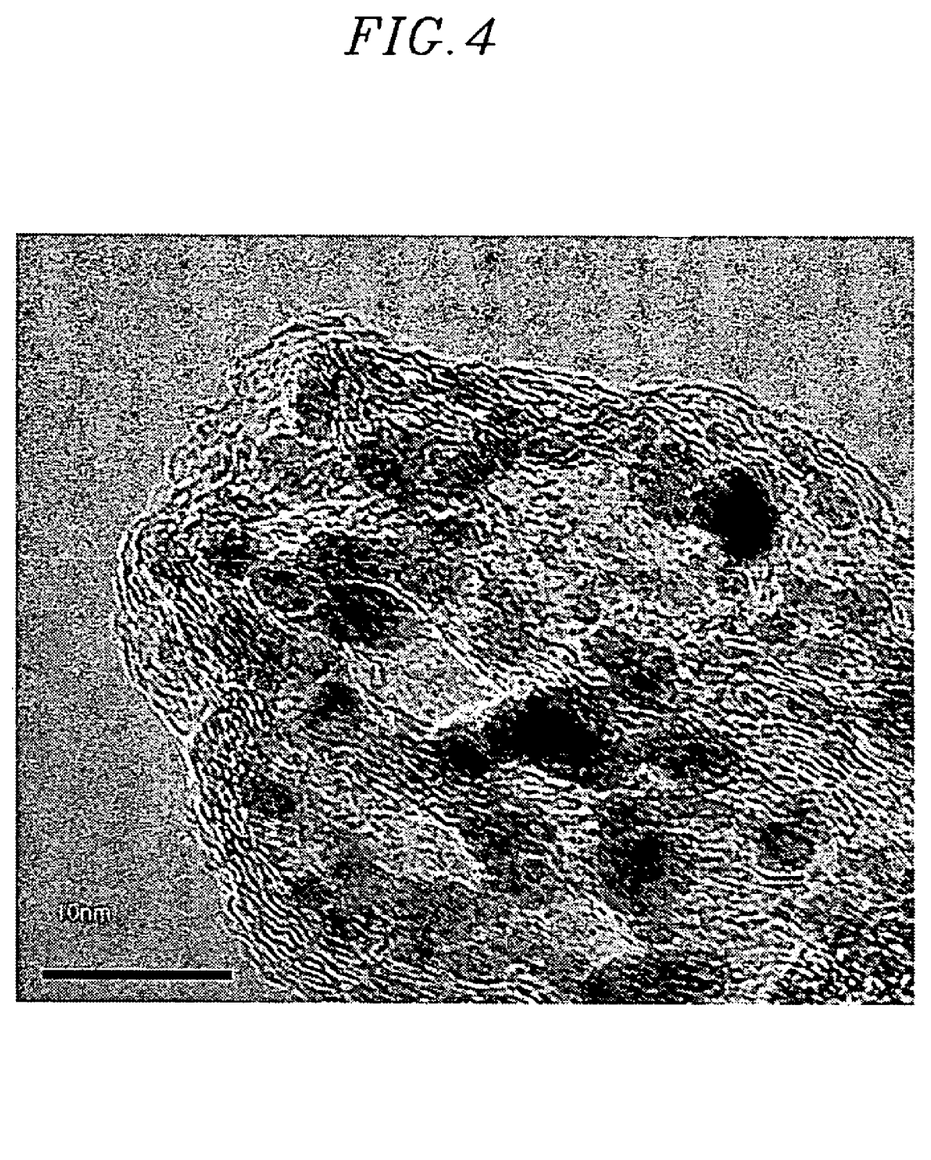
FIG. 4 is a TEM photograph of a cathode catalyst according to Example 2.

Transmission electron microscope (TEM) photographs of cathode catalysts according to Examples 1 and 2 are shown in FIGS. 3 and 4. In FIGS. 3 and 4, the darkest parts indicate Ru—Se. From the scale bar of FIGS. 3 and 4 representing 10 nm, it can be seen that the size of the cathode catalyst of the Examples 1 and 2 is 2 to 4 nm. The cathode catalysts according to Examples 3 to 10 had particle sizes ranging from 3 to 6 nm. On the contrary, the cathode catalyst according to Comparative Example 1 had a particle size of 10 nm.

Figure 5:
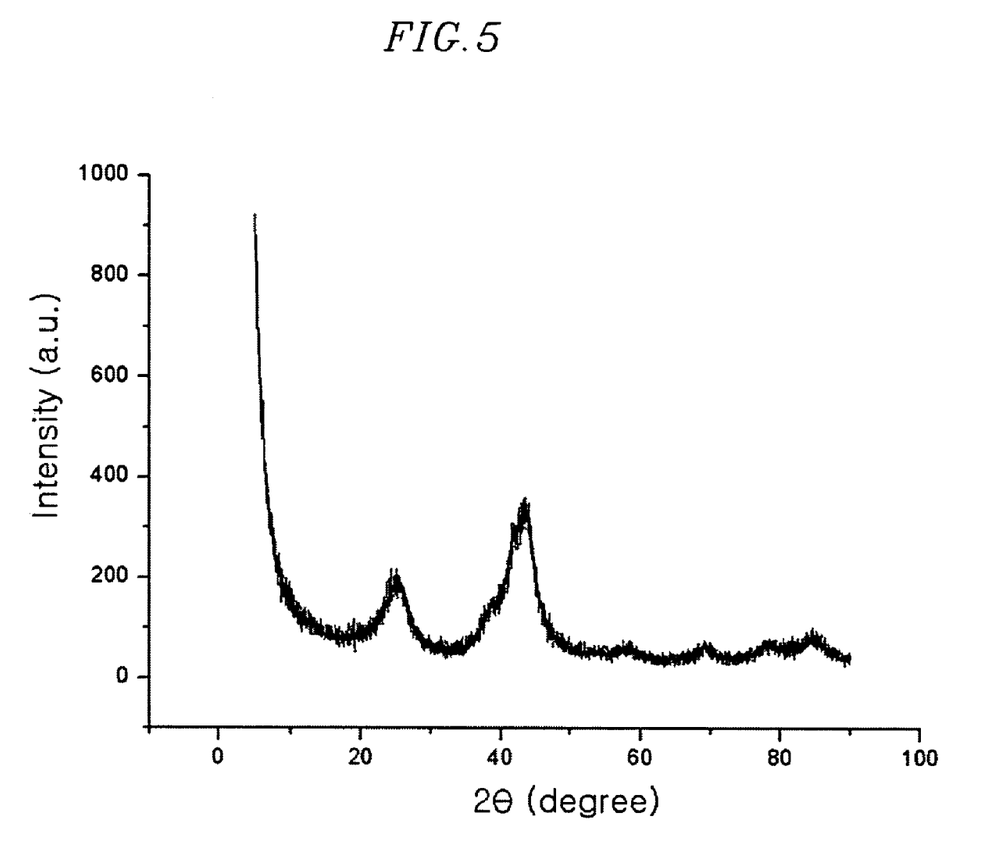
FIG. 5 is a graph showing X-ray diffraction peaks of the cathode catalyst according to Example 1.
Figure 6:
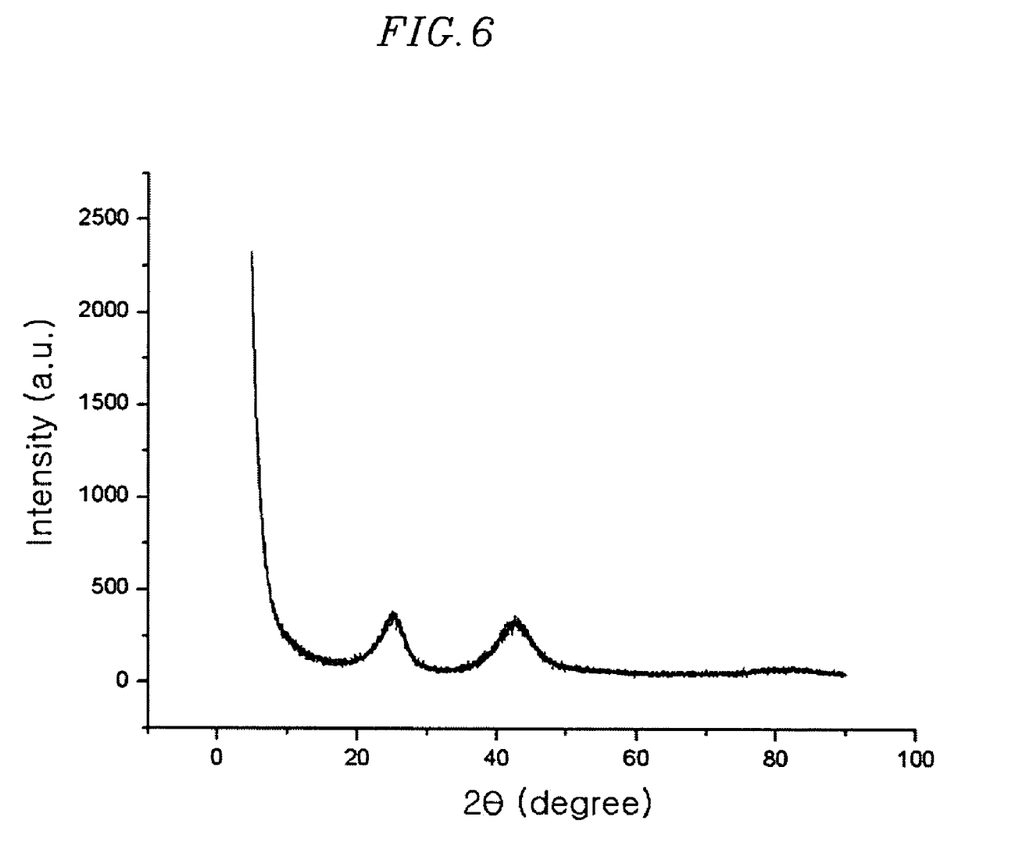
FIG. 6 is a graph showing X-ray diffraction peaks of the cathode catalyst according to Example 2.
Figure 7:
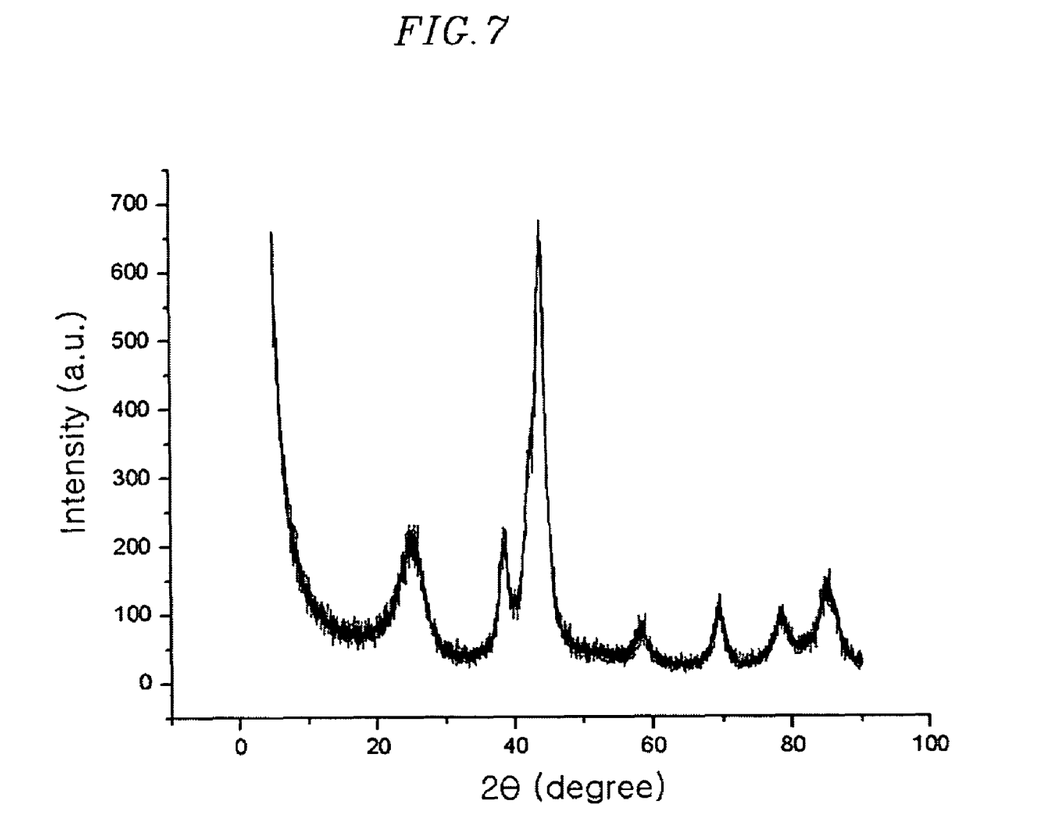
FIG. 7 is a graph showing X-ray diffraction peaks of the cathode catalyst according to Example 7.

X-ray diffraction peaks were measured for catalyst powders according to Examples 1 and 2, and Example 7. The results are shown in FIG. 5 to FIG. 7, respectively. X-ray diffraction peaks were measured using a CuKα ray at a scan rate of 0.05 deg/sec.

As shown in FIGS. 5 to 7, X-ray diffraction peaks of the catalysts according to Examples 1 and 2 are not sharp and are rather smaller than those of Example 7. As a result, catalysts according to Examples 1 and 2 are more amorphous than the catalyst according to Example 7.

From the X-ray diffraction peaks of catalysts according to Examples 1 and 2, and Example 7, the relative ratios of carbon peaks and ruthenium peaks were calculated. The results are shown in Table 1. Larger $I_{carbon\ peak}/I_{ruthenium\ peak}$ values indicate a greater amorphous ruthenium content. The results of the following Table 1 show that the cathode catalysts of Examples 1 and 2 include more amorphous ruthenium than the cathode catalyst of Example 7.

TABLE 1

| | $I_{carbon\ peak}/I_{ruthenium\ peak}$ |
|---|---|
| Example 2 | 1.01 |
| Example 1 | 0.56 |
| Example 7 | 0.35 |

Figure 8:
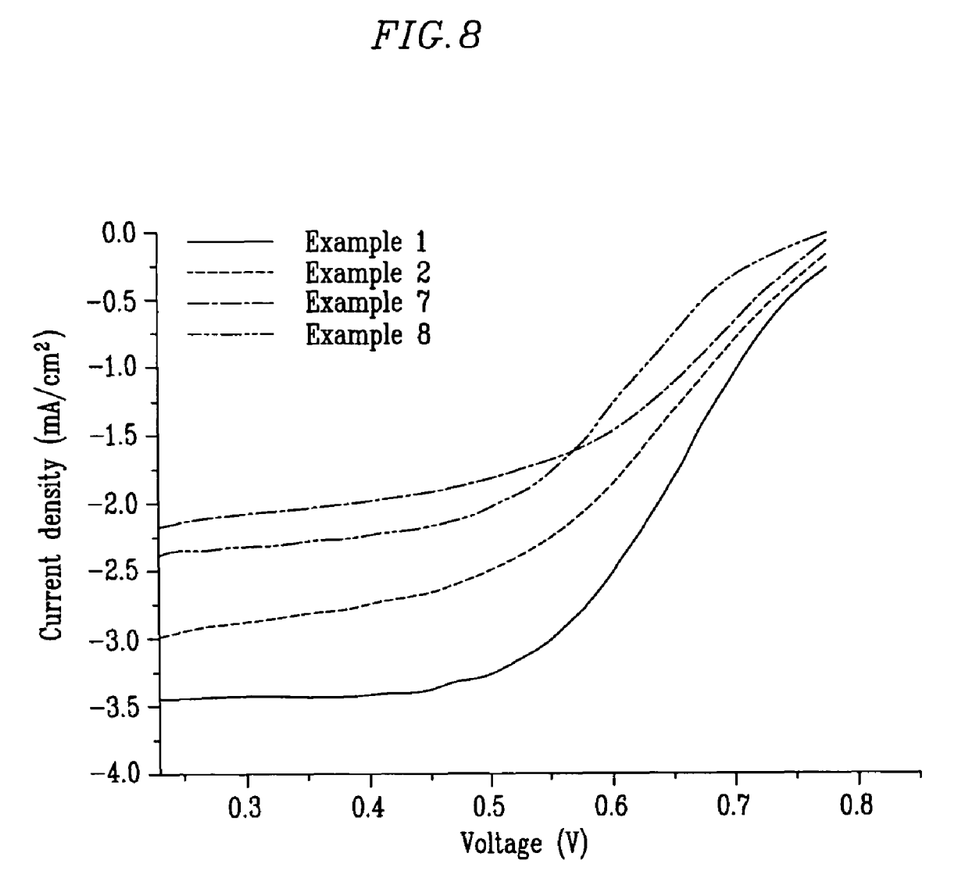
FIG. 8 is a graph showing catalyst activity of the cathode catalysts according to Examples 1 and 2, and Examples 7 and 8, measured using a rotating disk electrode (RDE).
Figure 9:
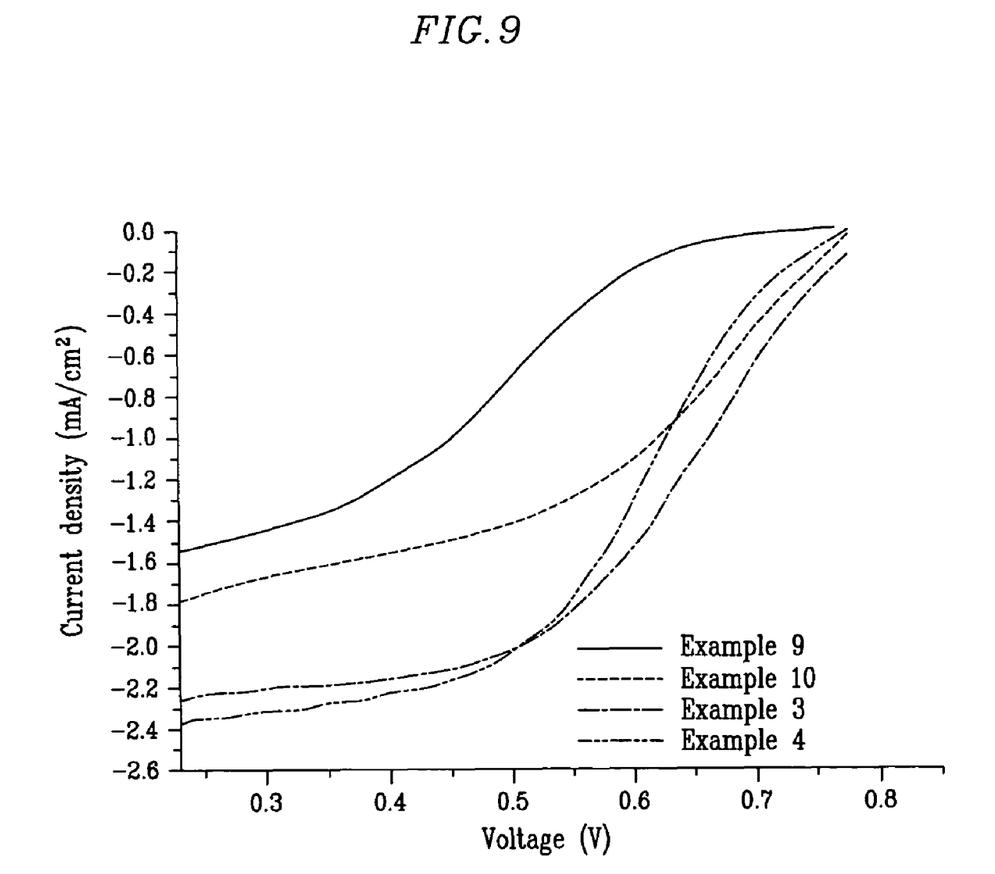
FIG. 9 is a graph showing catalyst activity of the cathode catalysts according to Examples 3 and 4, and Examples 9 and 10, measured using an RDE.
Figure 10:
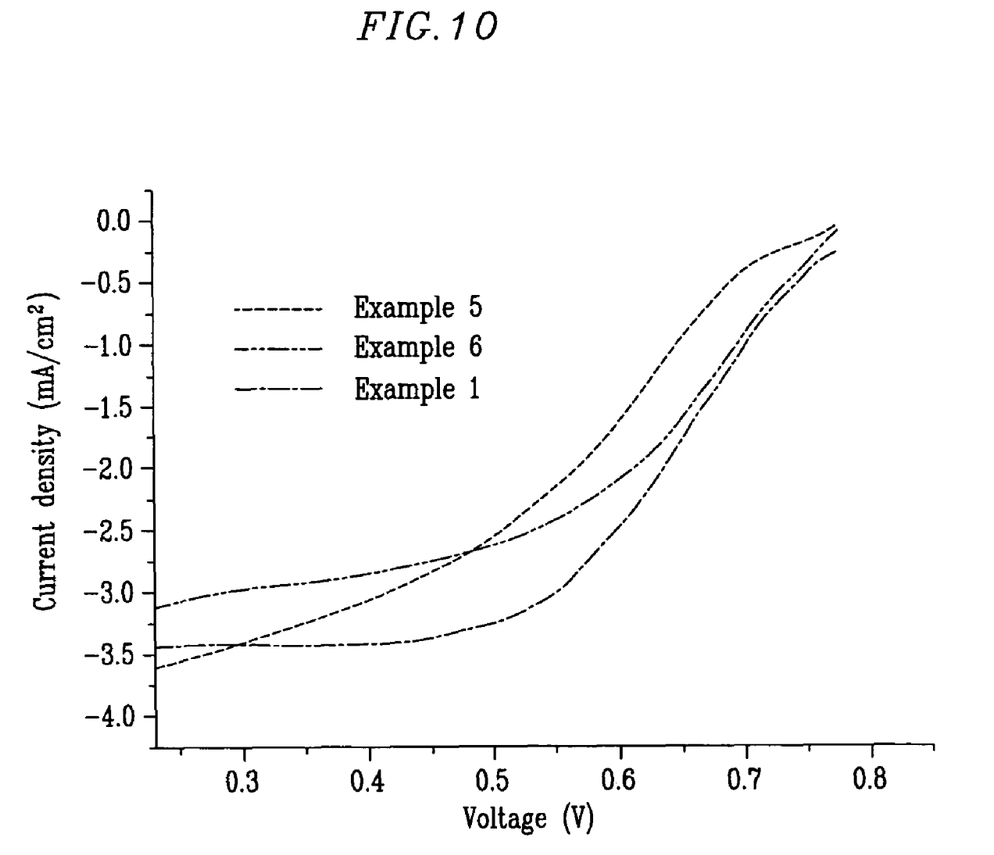
FIG. 10 is a graph showing catalyst activity of the cathode catalysts according to Examples 1, 5, and 6 measured using an RDE.

The catalytic activities of the catalysts according to Examples 1 to 6 and Examples 7 and 8 were measured using a rotating disk electrode (RDE). Ag/AgCl was used as a reference electrode, Pt was used as a counter electrode, and a 0.5M sulfuric acid solution was used. The activity was measured at 10 mV/s of a scan rate and a rotating speed of 2000 rpm. FIGS. 8 to 10 show the results, respectively.

As shown in FIG. 8, the amorphous catalysts according to Examples 1 and 2 are more effective compared to the crystalline catalysts according to Examples 7 and 8.

As shown in FIG. 9, the catalysts according to Examples 3 and 4 are more effective compared to the catalysts according to Example 9 and 10.

As shown in FIG. 10, the catalytic activity of catalysts according to Examples 1, 5, and 6 varied only a little depending on the kind of catalyst precursor.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A cathode catalyst for a fuel cell, comprising an amorphous Ru—Se alloy having an average particle size of less than or equal to 6 nm, wherein the cathode catalyst includes a carbon carrier and wherein the cathode catalyst has a peak intensity ratio of a carbon peak intensity with respect to a ruthenium peak intensity ($I_{carbon\ peak}/I_{ruthenium\ peak}$) ranging from 0.4 to 1.5 in an X-ray diffraction pattern measured using a CuK α ray.

2. The cathode catalyst of claim 1, wherein the cathode catalyst has an average particle size ranging from 3 to 5 nm.

3. The cathode catalyst of claim 1, wherein the cathode catalyst comprises 3 to 20 parts by weight of Se based on 100 parts by weight of Ru.

4. The cathode catalyst of claim 1, wherein the cathode catalyst further comprises a carrier and comprises 10 to 90 wt % Ru based on the total weight of the cathode catalyst.

5. A cathode for a fuel cell comprising a cathode catalyst comprising an amorphous Ru—Se alloy having an average particle size of less than or equal to 6 nm supported on a conductive electrode substrate, wherein the cathode catalyst includes a carbon carrier and wherein the cathode catalyst has a peak intensity ratio of a carbon peak intensity with respect to a ruthenium peak intensity ($I_{carbon\ peak}/I_{ruthenium\ peak}$) ranging from 0.4 to 1.5 in an X-ray diffraction pattern measured using a CuK α ray.

6. The cathode of claim 5, wherein the cathode catalyst is in the form of a cathode catalyst layer on the conductive electrode substrate.

7. The cathode of claim 5, wherein the cathode catalyst has an average particle size ranging from 3 to 5 nm.

8. The cathode of claim 5, wherein the cathode catalyst comprises 3 to 20 parts by weight of Se based on 100 parts by weight of Ru.

9. The cathode of claim 5, wherein the cathode catalyst further comprises a carrier and comprises 10 to 90 wt % Ru based on the total weight of the cathode catalyst.

10. The cathode of claim 6, further comprising a microporous layer between the conductive electrode substrate and the cathode catalyst layer.

11. A membrane-electrode assembly for a fuel cell, comprising: an anode and a cathode facing each other; and a polymer electrolyte membrane interposed between the anode and cathode, wherein the cathode comprises a cathode catalyst comprising an amorphous Ru—Se alloy having an average particle size of less than or equal to 6 nm, wherein the cathode catalyst includes a carbon carrier and wherein the cathode catalyst has a peak intensity ratio of a carbon peak intensity with respect to a ruthenium peak intensity ($I_{carbon\,peak}/I_{ruthenium\,peak}$) ranging from 0.4 to 1.5 in an X-ray diffraction pattern measured using a CuK α ray.

12. The membrane-electrode assembly of claim 11, wherein the cathode catalyst has an average particle size ranging from 3 to 5 nm.

13. The membrane-electrode assembly of claim 11, wherein the cathode catalyst comprises 3 to 20 parts by weight of Se based on 100 parts by weight of Ru.

14. The membrane-electrode assembly of claim 11, wherein the cathode catalyst further comprises a carrier and comprises 10 to 90 wt % Ru based on the total weight of the catalyst.

15. A fuel cell system comprising: an electricity generating element comprising: a membrane-electrode assembly comprising an anode and a cathode facing each other, and a polymer electrolyte membrane interposed between the anode and cathode; a fuel supplier for supplying the electricity generating element with a fuel; and an oxidant supplier for supplying the electricity generating element with an oxidant, wherein the cathode comprises a cathode catalyst comprising an amorphous Ru-Se alloy having an average particle size of less than or equal to 6 nm, wherein the cathode catalyst includes a carbon carrier and wherein the cathode catalyst has a peak intensity ratio of a carbon peak intensity with respect to a ruthenium peak intensity ($I_{carbon\,peak}/I_{ruthenium\,peak}$) ranging from 0.4 to 1.5 in an X-ray diffraction pattern measured using a CuK α ray.

16. The fuel cell system of claim 15, wherein the cathode catalyst has an average particle size ranging from 3 to 5 nm.

* * * * *